United States Patent
Peravali et al.

(10) Patent No.: US 7,471,998 B2
(45) Date of Patent: Dec. 30, 2008

(54) PROCESS AND DEVICE FOR ESTIMATING THE SERIOUSNESS OF ACCIDENT OCCURRENCES

(75) Inventors: Ravindra Peravali, Ulm (DE); Juergen Dickmann, Ulm (DE); Moheb Mekhaiel, Neu-Ulm (DE)

(73) Assignee: Daimler AG, Stuttgart (DE)

( * ) Notice: Subject to any disclaimer, the term of this patent is extended or adjusted under 35 U.S.C. 154(b) by 770 days.

(21) Appl. No.: 10/886,806

(22) Filed: Jul. 8, 2004

(65) Prior Publication Data

US 2005/0010340 A1      Jan. 13, 2005

(30) Foreign Application Priority Data

Jul. 8, 2003    (DE) ................... 103 30 954

(51) Int. Cl.
   *B60R 21/00*   (2006.01)
   *G01P 15/00*   (2006.01)
   *G06F 17/00*   (2006.01)

(52) U.S. Cl. ............. 701/29; 701/45; 701/48; 455/404.1; 280/735

(58) Field of Classification Search .......... 701/29, 701/33, 352, 45, 301, 48, 96, 30; 280/734, 280/735; 455/404.1, 567; 340/435, 903, 340/358.18, 825.36
See application file for complete search history.

(56) References Cited

U.S. PATENT DOCUMENTS

| | | | | |
|---|---|---|---|---|
| 5,202,831 A | | 4/1993 | Blackburn et al. | |
| 5,229,943 A | * | 7/1993 | Eigler et al. | 701/46 |
| 5,718,451 A | * | 2/1998 | White | 280/735 |
| 5,815,393 A | * | 9/1998 | Chae | 701/39 |
| 5,969,598 A | * | 10/1999 | Kimura | 340/436 |
| 6,199,903 B1 | | 3/2001 | Brambilla et al. | |
| 6,574,540 B2 | * | 6/2003 | Yokota et al. | 701/45 |
| 6,597,974 B2 | * | 7/2003 | Roelleke | 701/45 |
| 6,732,020 B2 | * | 5/2004 | Yamagishi | 701/1 |
| 2004/0006427 A1 | | 1/2004 | Stiller | |
| 2004/0088095 A1 | | 5/2004 | Eberle et al. | |
| 2005/0125127 A1 | * | 6/2005 | Bomar et al. | 701/45 |

FOREIGN PATENT DOCUMENTS

| | | |
|---|---|---|
| DE | 42 22 595 A1 | 1/1993 |
| DE | 44 21 508 A1 | 12/1994 |
| DE | 44 21 960 A1 | 1/1996 |
| DE | 198 16 989 A1 | 11/1999 |
| DE | 101 03 401 A1 | 8/2002 |
| DE | 101 31 198 A1 | 1/2003 |
| DE | 101 55 663 A1 | 5/2003 |
| DE | 101 56 837 A1 | 6/2003 |
| EP | 1 312 514 A2 | 5/2003 |
| WO | WO 90//11 207 A1 | 10/1990 |

* cited by examiner

*Primary Examiner*—Tan Q Nguyen
(74) *Attorney, Agent, or Firm*—Patent Central LLC; Stephan A. Pendorf

(57) ABSTRACT

The invention concerns a process and a device for estimating the seriousness of an accident occurrence using parameters regarding the condition of movement of a vehicle during the occurrence of the accident. Therein, the time progression of the parameters regarding movement status of the vehicle are employed for estimation of the seriousness of the accident occurrence.

19 Claims, 1 Drawing Sheet

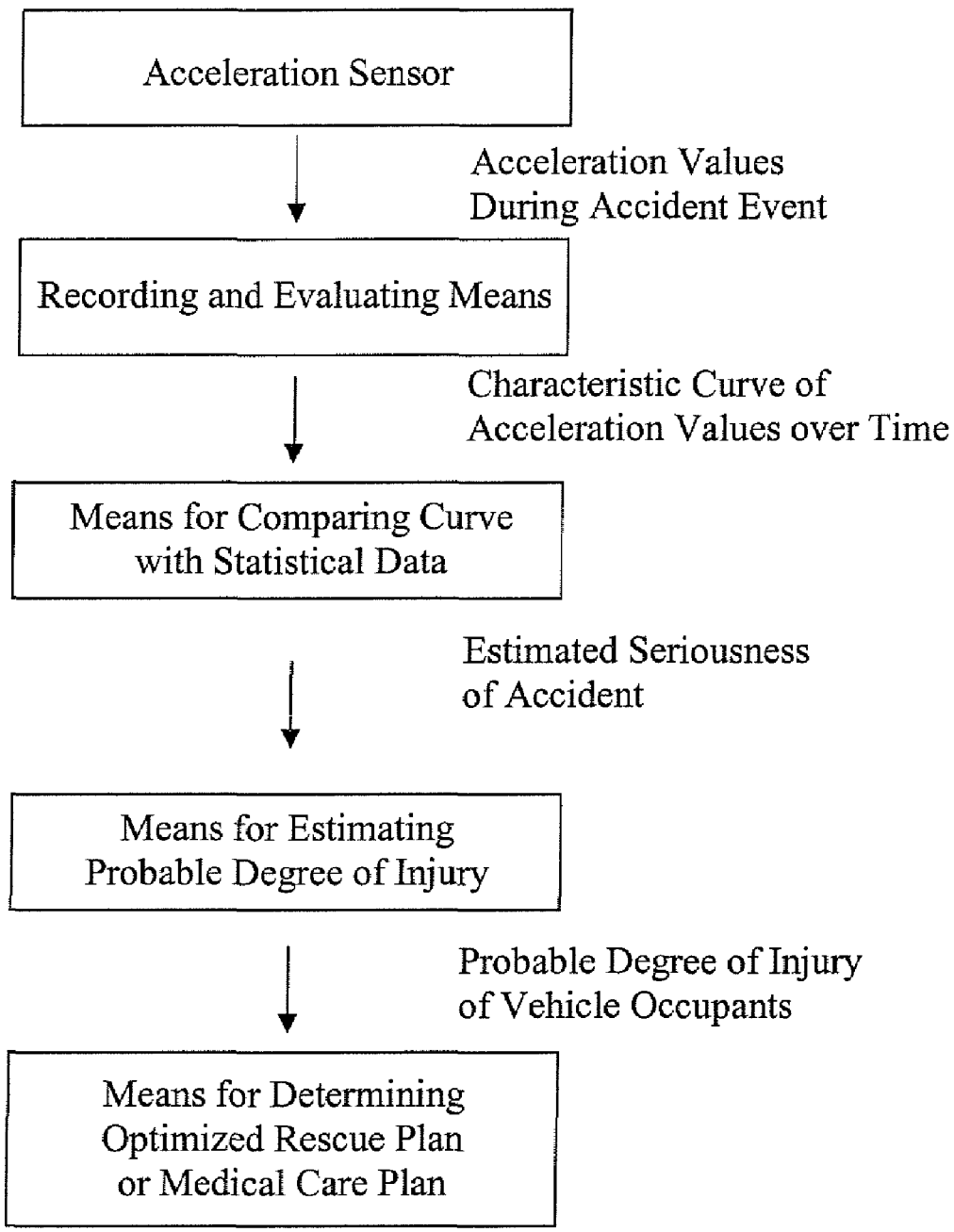
FIGURE

US 7,471,998 B2

PROCESS AND DEVICE FOR ESTIMATING THE SERIOUSNESS OF ACCIDENT OCCURRENCES

BACKGROUND OF THE INVENTION

1. FIELD OF INVENTION

The invention concerns a process and a device for estimating the seriousness of accident occurrences.

2. Related Art of the Invention

An important factor in the providing of medical care for or, as the case may be, rescuing of vehicular traffic accident victims is the speed and precision of information reaching the rescuers.

The information regarding the seriousness of an accident occurrence can be used for example to optimally adapt the equipment and personnel of a rescue team being sent to an accident site to the specific type accident and therewith to insure an optimal level of care for the involved persons and, at the same time, optimal utilization of rescue personnel and material.

For this, it is necessary in a first step to estimate the seriousness of the accident. Accordingly, in accordance with the state of the art, various processes and devices have been proposed.

Thus, for example, in the Japanese patent application with the application number 10-163495 a system is proposed with which the seriousness of an accident occurrence is estimated on the basis of an acceleration value and the direction of impact (front, side or rear). In the cited document it is further proposed to designate a likely degree of injury of the vehicle occupants on the basis of stored statistic data.

The proposed solution however exhibits disadvantages. For example, the quality of the information determined by the system proposed in the text depends to a great extent on the depth and quality of the available statistical data. Besides this, only one single acceleration value and a general direction of collision (front, side or rear) is determined.

SUMMARY OF THE INVENTION

The present invention is concerned with the task of providing a precise as possible estimation of the seriousness of an accident occurrence.

This task is solved by a process for estimating the seriousness of an accident occurrence, comprising: determining a sequence of acceleration values by an acceleration sensor during an accident event, recording and evaluating the determined sequence of acceleration values for producing a characteristic curve of the acceleration values over time, estimating the seriousness of the accident occurrence by comparing the characteristic curve with statistic data, based on the estimated seriousness of the accident occurrence, determining a probable degree of injury of vehicle occupants, and determining at least one of an optimized rescue plan and an optimized medical care based on the determined probable degree of injury of the vehicle occupants and a corresponding device.

BRIEF DESCRIPTION OF THE DRAWING

There is shown a schematic diagram of the process according to the present invention.

DETAILED DESCRIPTION OF THE INVENTION

The inventive process is characterized, among other things, in that for the estimation of the seriousness of an accident occurrence parameters concerning the condition of movement of a vehicle during the accident occurrence are utilized, and that in particular a time progression of the parameters regarding the condition of movement of the vehicle are employed. In other words, it is not a singular value such as, for example, a maximal acceleration that is detected, but rather acceleration data are determined and evaluated over a longer period of time. These acceleration data can be detected using, for example, one or more acceleration sensors.

A typical automobile collision takes approximately 100 ms; it is comprised in general not of a single impact, but rather a series of individual impact incidents, which can be measured by the acceleration sensors as acceleration pulses. For example, in the case of a frontal impact of two vehicles, it is in general not a single acceleration pulse that is exhibited, but rather a series of this type of pulse, which originate on the one hand from the collision of the involved vehicles on the other hand however also from the impact events of the occupants with parts of the interior.

In accordance with the inventive process the sequence of acceleration values determined by the acceleration sensor are recorded and evaluated during the above-mentioned timeframe. This produces a characteristic curve of acceleration values over time. The information content of such a curve greatly exceeds the information value of merely the maximum acceleration. In particular, it becomes possible with the evaluation of the obtained curve to reliably provide indications regarding the type and the precise sequence of the occurred collisions. Therein parameters such as, for example, the maximum acceleration, the number of relevant pulses, the duration of the impact as well as the average acceleration can be determined and subjected to a further evaluation. For example, there is the possibility to distinguish between the impact with a hard and the collision with a soft obstacle. The thus obtained information can be utilized in advantageous manner to determine the seriousness of the concerned accident occurrence with sufficient precision.

The estimated seriousness of the accident occurrence according to the present process, in its various embodiments, can be used in advantageous manner additionally for determining the probability of the degree of injury of vehicle occupants. To do this, the correlation between the seriousness of an accident occurrence and the degree of injury of vehicle occupants can be used. The high quality of the prediction of the degree of injury obtained with the present described process is particularly significant for this.

For determining the degree of injury there can be used, for example, the Abbreviated Injury Scale (AIS). The classification of the degree of injury according to this scale is well recognized in the field, can be traced back to the "Association for the Advancement of Automotive Medicine". The AIS is comprised essentially of a six step scale, extending from slight injury to fatal injury.

The correlation of mechanical parameters such as for example the speed deferential or acceleration values to the individual steps of the AIS can be carried out on the basis of statistical data.

Therewith, the presently described process makes it possible in combination with the AIS to directly derive from the mechanical parameters of an accident occurrence the probable injuries of vehicle occupants and the presumed seriousness of the injuries. This information is of critical importance the first phase of the rescue of accident victims, the so-called "Golden Hour".

From the obtained sensor data there can subsequently be determined in advantageous manner the duration or the peak value of an acceleration pulse. These two parameters allow an initial general estimation of the accident event and can be employed for example in order to optimize the correspondence of the algorithm employed for the analysis of the progression of the collision event to the actual existing collision events.

Beyond this, the sensor data provided by the acceleration sensors are suited to determine a speed deferential, for example, before and after the accident occurrence. This can be achieved in advantageous manner thereby, that the speed differential is determined by the time integration of the acceleration values. Therein, speed differentials for any desired point in time or, as the case may be, time span during the accident occurrence, can be determined. The useful parameters of the speed differential can be determined in simple manner for the determination of the seriousness of the accident by evaluation of the acceleration data without the requiring supplemental sensor data.

In accordance with the present invention it is particularly advantageous to determine acceleration values in various spatial directions. By evaluation of the data provided by the sensors over the time sequence of the acceleration in different spatial directions it becomes possible not only to determine the seriousness of the collision and its exact time sequence, but rather also to provide a precise indication regarding the exact direction of the occurred collision.

Thereby there is provided the possibility to determine not only the general estimation as to whether the collision is from the front, back or side, but rather, the precise direction of the collision. By this embodiment of the invention it becomes possible also to reliably detect diagonal collisions and further to make a more precise estimation of the seriousness of the accident occurrence.

It has been found useful to position or orient the sensors in three orthogonal spatial directions in the vehicle. Thereby, the precision of the determination of the direction of the collision is substantially increased.

The determination of the seriousness of the accident occurrence can be made more precise in particular thereby, that sensor data of at least one supplemental sensor is employed. Thereby the possibility is achieved, on the basis of a data fusion, that is, a combined evaluation of data of different sensors, to produce a further improvement in the quality of the estimation of the seriousness of the accident occurrence. It is particularly advantageous to employ rollover sensors, seatbelt sensors or speed sensors as the supplemental sensors.

As the rollover sensor there can be employed, for example, a gyroscope. The information regarding whether the accident occurrence is associated with a tip-over of the involved vehicle provides an important supplement to the determination of the seriousness of the accident occurrence. Particularly in the case of convertibles and roadsters this information is given an increased importance, since an inversion of this type of vehicle typically is associated with increased likelihood of injury of the vehicle occupants.

Therein it is particularly advantageous to employ, for sensing of rollover, the sensors already provided in these vehicles and used for triggering a retractable roll bar.

In similar manner the seatbelt sensors can provide data for subsequent evaluation. Therein it has been found useful to evaluate the tension or pull forces on the seatbelt during the accident event. From this information it can be determined for example to which load or stress the thorax of a vehicle occupant was subjected during the collision.

In addition, speed information can be employed for determining the seriousness of the accident occurrence. In particular, the speed of the vehicle shortly before the collision provides an important piece of information for estimation of the magnitude of an accident event. One embodiment that can be realized with little expense for determining the speed of the vehicle prior to the collision involves use of the speed value already measured by the speedometer.

Herein it is particularly advantageous when the information regarding the seriousness of the accident event is transmitted to a center such as an emergency rescue center after the occurrence of the accident. For transmitting the information there can be employed for example an existing rescue system such as the system "TeleAid", which is available in vehicles of the Mercedes-Benz mark. On the basis of the transmitted information it becomes possible in the rescue center to optimize both the personnel as well as the equipment of the rescue team for the existing accident event, and to provide the best possible care for accident victims immediately after the occurrence of the accident. Thereby it becomes possible to effectively avoid injuries which require long periods of therapy.

There is a yet further advantageous embodiment or supplemental means for estimation of the seriousness of an accident event, in that information regarding damage to the vehicle is utilized. For this, the diagnostic system already present in vehicles can be employed. For example, from the leakage of coolant or motor oil, which can be easily determined by the diagnostic system by detecting a pressure drop in the associated partial system, it can be concluded that massive damage to the front part of the vehicle had occurred. The use of the thus obtained information in a subsequent data fusion provides a further input for increasing the precision of the results of the prediction.

The medical care of the vehicle occupants following the accident event can further be optimized by providing the responding rescue personnel with medical data of the vehicle occupants following the accident occurrence. Therein it is useful to provide, for example, information regarding possible allergies, blood type or, as the case may be, anatomical specifics of the vehicle occupants, already during the transmission of the information regarding the accident event to the rescue center. This makes it possible to tailor the subsequent medical care to the accident victims.

One device, which can be used in realizing the inventive process, includes at least one sensor for determining parameters regarding the condition of movement of a vehicle as well as an evaluation unit. Herein, the evaluation unit includes means for determining the seriousness of the accident event on the basis of the progression of the parameters regarding condition of movement of the vehicle. For this, the sensor can be, for example, a speed sensor or acceleration sensor. The evaluation of the inventive device can include in particular a signal processing unit as well as buffer storage. The parameters determined by the one or more sensors regarding condition of movement are stored intermediately in the buffer storage and subsequently further processed in the evaluation unit.

Herein it has been found particularly useful to so design the evaluation unit, that it is capable of determining the duration and/or the peak value of an acceleration pulse. Similarly, it is advantageous to optimize the evaluation unit in that it makes possible a determination of speed differential for example at various points in time during the accident event or also prior to and subsequent to the accident occurrence. This can be achieved in advantageous manner thereby, that the evaluation unit includes an integration unit, with which a rapid integration of measured acceleration values and therewith a simple determination of speed differentials is made possible.

In a further advantageous embodiment of the invention multiple acceleration sensors oriented in various spatial directions are provided in the vehicle. For example, using one acceleration sensor the acceleration in the direction of travel can be determined, a different sensor can be used to determine the side acceleration and a further sensor can be used to determine the vertical acceleration. In combination with an arrangement of sensors of this type, the evaluation unit can be so designed, that it is adapted to determine the precise direction of a collision using the various acceleration values provided by the sensors.

A further advantageous embodiment of the invention is comprised therein, that at least one additional sensor is provided. This can be for example a roll-over sensor, a seatbelt sensor or a speed sensor. The parameter determined by the one or more additional sensors can be employed herein in advantageous manner in order to increase the precision of the determination of the seriousness of the accident event.

The inventive device can be enhanced to the extent that the evaluation unit is adapted to provide a prediction, based on the evaluated seriousness of the accident occurrence, of the possible degree of injury of the vehicle occupants. For this, the evaluation unit includes for example a data bank, in which various degrees of seriousness of accident occurrences are associated with appropriately stepped possible injuries. As the classification scheme for the possible injuries, it can be considered to use the already described AIS.

In order insure the most efficient possible rescue of accident victims, it is desirable to provide supplemental means with which the information obtained by the inventive device can be transmitted promptly to, for example, a rescue center. This can be achieved in simple manner by the mobile telephone already available in many cases in vehicles, which transmits an appropriate short message regarding the accident occurrence recognized by the inventive device.

Beyond this, it has been found useful to store medical information regarding the vehicle occupants in a memory unit and to transmit this to the rescue center in the case of an accident or, as the case may be, to make this available to the rescue personnel. For this, it is not necessary that the memory unit be located in the vehicle. It is advantageous for example to use patient data from the data bank of a hospital. Therewith it is sufficient to transmit essentially the identity of the vehicle occupants involved in the accident. The associated medical data or information can subsequently be obtained from the above-mentioned data bank, so that it is not necessary to have a duplicate copy of sensitive data storage in two different storage locations, which information is in any case complex to input and, for information security purposes, is liable to cause concern. The identity of the vehicle occupants can be obtained in advantageous manner for example using acquired biometric data based vehicle authentication systems.

One process for employing the inventive process with the above-described device is described in the following by way of example:

In a first step it is decided whether the inventive process is to be started. For this, sequential acceleration values are subjected to evaluation and it is determined whether, over the course of a certain number of measured values, an acceleration of 2 g is exceeded. In this case it is assumed that the vehicle dynamic has been subjected to changes of sufficient strength to make it possible to conclude that an accident has occurred, and the process is started.

Thereafter, the values measured by the acceleration sensors are stored in order to be available for the subsequent evaluation. Data collection is stopped when the measured acceleration values do not exceed 1 g for a predetermined period of time.

In a further step the acceleration values are numerically integrated, in order to obtain an estimation of the speed differential. Therein the speed differential provides for example the difference of the speeds directly prior to the collision and subsequent thereto. This can be employed subsequently in combination with the characteristics of the acceleration pulse for estimation of the seriousness of the accident occurrence.

Parallel thereto, the acceleration values are evaluated in order to determine the characteristics of the acceleration pulse which was measured during the accident occurrence. In particular, from the acceleration values the peak acceleration and the duration of the collision are determined.

Further, from the acceleration values of the sensors arranged in different spatial directions, the direction of the collision is determined in accordance with this process. This can occur for example by evaluating the acceleration differentials along the different spatial directions.

Finally, the results obtained according to the process are used in order to estimate the possible degree of injury of the vehicle occupants. For this, the AIS is preferably employed for classification of the injuries. The thus obtained information can subsequently be transmitted to a rescue center, for example, using a mobile telephone, and rescue measures optimized on the basis of this information can be initiated.

The invention claimed is:

1. A process for estimating the seriousness of an accident occurrence, comprising:
    determining a sequence of acceleration values by an acceleration sensor during (an accident event,
    recording and evaluating the determined sequence of acceleration values for producing a characteristic curve of the acceleration values over time,
    estimating the seriousness of the accident occurrence by comparing the characteristic curve with statistic data,
    based on the estimated seriousness of the accident occurrence, determining a probable degree of injury of vehicle occupants, and
    determining at least one of an optimized rescue plan and an optimized medical care based on the determined probable degree of injury of the vehicle occupants.

2. The process according to claim 1, further comprising determining a duration of impact or a peak value of an acceleration pulse from the recorded acceleration values.

3. The process according to claim 1, including determining a speed differential from the recorded acceleration values.

4. The process according to claim 3, wherein the speed differential is determined by time integration of the acceleration values.

5. The process according to claim 1, wherein the acceleration values are detected in various spatial directions.

6. The process according to claim 5, wherein the spatial direction in which the collision occurred is determined from the measured acceleration values.

7. The process according to claim 1, wherein sensor data from at least one supplemental sensor is utilized for estimating the seriousness of the accident occurrence, in particular a roll over sensor, seatbelt sensor or a speed sensor.

8. The process according to claim 1, wherein the information regarding the seriousness of the accident occurrence is transmitted to a center following the accident occurrence.

9. The process according to claim 1, further comprising using information regarding damage to the vehicle in estimating the seriousness of the accident occurrence.

10. The process according to claim 1, further comprising providing rescue personnel with medical data regarding the vehicle occupants following the accident occurrence.

11. A device for estimating the seriousness of an accident occurrence, comprising:
- an acceleration sensor for determining a sequence of acceleration values during an accident event,
- means for recording and evaluating the determined sequence of acceleration values for producing a characteristic curve of the acceleration values over time,
- means for estimating the seriousness of the accident occurrence by comparing the characteristic curve with statistic data,
- means for determining a probable degree of injury of vehicle occupants based on the estimated seriousness of the accident occurrence, and
- means for determining at least one of an optimized rescue plan and an optimized medical care based on the determined probable degree of injury of the vehicle occupants.

12. The device according to claim 11, wherein a duration of impact and/or a peak value of an acceleration pulse are determined from the recorded acceleration values.

13. The device according to claim 11, wherein a speed differential is determined from the recorded acceleration values.

14. The device according to claim 13, wherein the speed differential is determined by time integration of the acceleration values.

15. The device according to claim 11, wherein the acceleration values are detected in different spatial directions.

16. The device according to claim 15, wherein the spatial direction in which the collision occurred is determined from the measured acceleration values.

17. The device according to claim 11, further including at least one supplemental sensor, in particular a roll over sensor, seatbelt sensor or a vehicle speed sensor.

18. The device according to claim 11, further comprising a transmitter adapted to transmit to a center information regarding the seriousness of the accident occurrence following the accident occurrence.

19. The device according to claim 11, further comprising a memory unit containing medical data concerning the vehicle occupants and adapted to providing medical data to rescue personnel following the occurrence of the accident.

* * * * *